United States Patent [19]
Chia et al.

[11] Patent Number: 4,976,033
[45] Date of Patent: Dec. 11, 1990

[54] JEWELER'S HAMMER BIT

[76] Inventors: Meang Chia; Larry Ta, both of 412 W. Sixth St., #1116, Los Angeles, Calif. 90014

[21] Appl. No.: 428,162

[22] Filed: Oct. 27, 1989

[51] Int. Cl.$^5$ .......................... B26F 1/00; B21K 21/00
[52] U.S. Cl. ......................................... 30/366; 76/119
[58] Field of Search .................................. 30/366–368, 30/164.9, 164.5; 76/101 R, 101 D, DIG. 12

[56] References Cited
U.S. PATENT DOCUMENTS 1,370,662  3/1921  Michol ..................... 76/DIG. 12 X
1,624,197  4/1927  Abelt ............................. 30/164.9 X Primary Examiner—Douglas D. Watts
Attorney, Agent, or Firm—Ladas & Parry

[57] ABSTRACT

The invention diamond-tipped bit that is used with a jeweler's hammer. The bit has a shaft portion that has formed on one end a threaded portion for screwing the bit into the threaded receiving portion of a jeweler's hammer. On the other end of the shaft is formed a bore. A diamond is placed within the bore so that the rear flat portion of the diamond is flush against the rear surface of the bore. The annular rim of the bore is circumferentially pressure-folded back into the diamond, leaving the working portion of the diamond protruding from the shaft and the folded rim.

6 Claims, 1 Drawing Sheet

JEWELER'S HAMMER BIT

FIELD OF THE INVENTION

This invention pertains to the field of jewelry design implements, and more particularly to a hammer bit, used in conjunction with a hand-held hammering device, to impart design elements and patterns to precious metals.

BACKGROUND OF THE INVENTION

Jewelry designers use a hand-held hammering device for designing, engraving and setting purposes. The hammer is adaptable to a number of purposes because, much like a conventional drill, it is designed to accept bits of various configurations and sizes. Some bits are flat at their extremities. These are generally used for hammering and setting purposes. For instance, in the course of "channel setting", a precious stone is placed in a channel or groove formed on malleable metal material. Portions of the surrounding metal are hammered against the precious stone and thus the stone is set. The width of the flat area of the bit can be varied to adapt to differing sizes of stones and/or channels. Another bit may be formed so that its extremity is pointed. This bit may be used to strike a piece of precious metal a multitude of times with its point to engrave a design onto the piece or to give the piece a unique grainy texture. These bits are made from metals that are obviously harder than the precious metals that they are used on.

There presently exists a bit that is formed to accommodate a diamond at its working end. The diamond is held into place by four tabs extruding from the bit and folded into the diamond, much like the manner a diamond is clasped and set on a ring. Because of the hardness of the diamond, and because the diamond tip is shaped to a sharp point, the result of hammering a surface of gold, for a example, with the diamond point is a unique, highly expensive-in-appearance texture that glistens and is known as "laser diamond brilliance". The drawback of this diamond-tipped bit is that after a certain amount of use, the diamond eventually loosens from its position because of the constant pressures exerted on the metal tabs. The loosened diamond significantly affects the quality and accuracy of the craftmanship performed on the jewelry. In some instances stress may cause a tab to break and render the bit unusable altogether.

SUMMARY OF THE INVENTION

The invention is a diamond-tipped bit for use with a jeweler's hammer. The bit has a shaft portion with a threaded portion formed on one end and a bore formed on the other end. The bore has a rear surface and an annular rim portion surrounding the bore. A diamond is shaped to have a flat rear portion and pointed tip. The diamond is slightly smaller in width than the diameter of the bore, and has a length longer than the depth of the bore. The annular rim portion is folded to clasp the diamond around an entire circumference into a firm stationary position within the bore.

The present invention provides a much more sturdy and precise implement which overcomes the prior art deficiencies mentioned above. This is accomplished by providing for a new improved manner of mounting the diamond to the tip of a bit. Instead of using tabs to hold a diamond onto a tip of a bit, a portion of the diamond is actually embedded into the bit itself. A bore, slightly larger in width than the diamond itself, is formed on the end of a bit. The depth of the bore is less than the length of the diamond. The end of the diamond opposite to the pointed end is then placed in the bore. The rim of the bore is then pressure fitted and compressed onto the portion of the diamond below the point. The result is a diamond-tip bit where the diamond is more durably and steadfastly bonded to the bit than that known previously in the art. The invention is a precise and long-lasting implement that permits the jeweler to create better crafted objects of art while at the same time, realizing him savings in costs and repairs.

BRIEF DESCRIPTION OF THE DRAWINGS

In describing the invention, reference will be made to the accompanying drawings wherein.

FIG. is a perspective exploded view of the invention and the hand-held hammering device to which the invention is attached for use.

DETAILED DESCRIPTION

Figure 1:
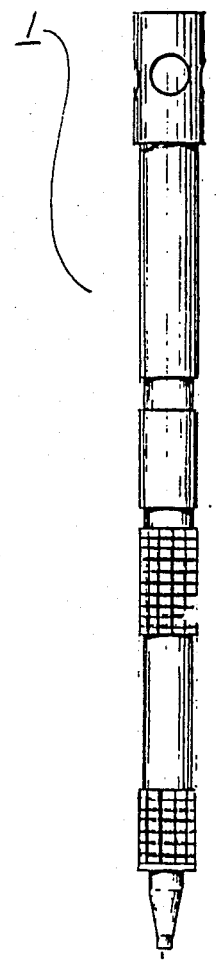

Referring now to the drawings, there is illustrated in FIG. 1 a view of the bit 2 and the implement it is used with, a jeweler's hammer 1. The hammer 1 is a hand-held device that provides a piston-like motion at one end. One example of the hammer is made by Badeco, model number 101329, 222-RL. Bits of varying shapes can be attached to the driven portion of the hammer 1. The bits, so driven, can be used by a jewelry designer to place differing designs, patterns and textures on a piece of jewelry.

Figure 2:
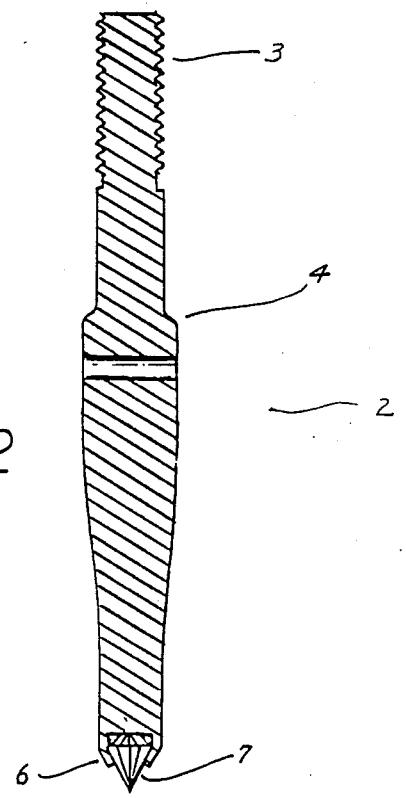
FIG. 2 is a cross-sectional view of the invention through its length as indicated in FIG. 1 as 2—2.
Figure 5:
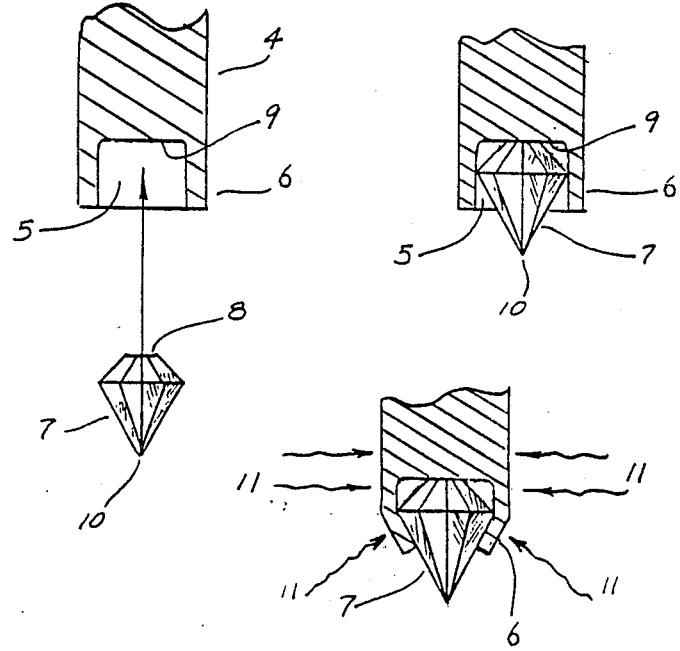
FIG. 5 is a further view of the invention of FIG. 4 as pressure is applied to the tip of the invention causing the rim of the compartment to fold into the diamond.

FIG. 2 is a cross sectional view of the bit from the viewpoint 2—2 of FIG. 1. The scale has been exploded to better depict the bit. The bit is comprised of a threaded portion 3 and a shaft portion 4. The bit 1 is normally screwed into the hammer 1 through the threaded portion via a corresponding threaded receiving portion on the driven portion of the hammer 1. As best viewed in FIG. 3, bore 5 is formed on the end of the bit 2 opposite to the threaded portion 3. Surrounding the bore 5 is an annular rim portion 6. The annular rim portion 6 surrounds, clasps and firmly anchors a diamond 7, after it is deformed, as will be seen with reference to FIG. 5.

Figure 3:
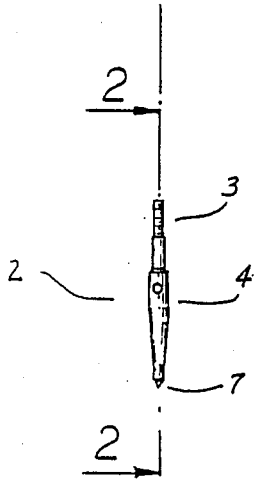
FIG. 3 is an enlarged cross-sectional view of the tip of the invention showing a diamond as it is to be placed into the compartment.
Figure 4:
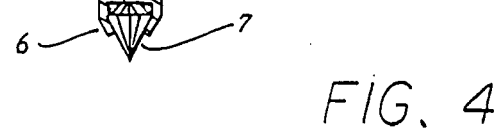
FIG. 4 is an enlarged cross-sectional view of the tip of the invention after the diamond has been placed into the compartment.

Referring to FIGS. 3 and 4, the diamond 7 has been shaped so that it has a flat rear portion 8 that sits flush against the rear surface 9 of the bore 5. Opposite the flat rear portion 8, the diamond 7 has a sharp point 10 that is used to contact against precious metals and other materials used in the jewelry-making process. In the preferred embodiment, the diamond point is formed with 32 facets but a diamond point comprising other numbers of facets is possible. The annular rim portion 6, that portion of the bit that peripherally surrounds the bore 5, has been pressure-fitted 11 and folded circumferentially into the side of the diamond 7 to hold it firmly in place.

The process of making the bit involves taking a shaft portion 4, forming a threaded portion 3 on one end and a bore 5 therethrough on the other end. A diamond 7, is shaped to have a flat rear portion 8 and a sharp point 10 opposite the flat rear portion 8. The diamond 7, shaped to be slightly smaller in width but longer in length than the bore 5, is then placed into the bore 5 with flat rear portion 8 flush against the rear surface 9 of the bore 5. Pressure 11, strong enough to deform the metal comprising the bit, is then applied to the rim 6, causing it to fold and circumferentially clasp the diamond 7 onto the rear surface 9.

The pressure 11 may be exerted by any appropriate means. One preferred method is by using a press such as a Dake No. 0 Single Leverage and No. OS Wheel Operated Press, made by Dake of Grand Haven, Mich. The bit 2 is stably held in place under pressure rams by a clamping device with the bore facing up toward the pressure rams. A pressure transferring sleeve, with one end having a cone-shaped bore formed to fit over without disturbing or contacting the centrally located diamond 7 while simultaneously being capable of exerting pressure on the peripherially located rims, is fitted over the annular rim portion of the bit and the diamond contained therein. Pressure is transmitted from the rams of the press, through the sleeve and onto the rim. The rims are pressured onto the diamond 7 so that diamond 7 is held firmly and soldily in place. Movement of the diamond 7 within the bit 2 is virtually eliminated.

The finished bit must be hard and capable of withstanding extreme stress without malleability. However the metal used must also be capable of deformation so that the rim 6 can be folded back into the diamond 7 to hold it in place. This is accomplished by first manufacturing the bit from a malleable metal, such as Truform, that has deep hardening qualities. Truform is a general purpose oil hardening, non-deforming alloy tool steel that is available through Jessup Co., 500 Green St., Washington City, PA. After the diamond is secured in its finished position, the bit, diamond and all, is then subjected to a hardening process that may include annealing, hardening, quenching and tempering. In particular the bit is oil quenched from 1475 degrees Fahrenheit and tempered at 300 degrees Fahrenheit for 2½ hours. The result is a bit with a Rockwell hardness of C62/64. This is only one manner of hardening the malleable metal. Other metals and variations of time and temperature may be used so long as the malleable metal is transformed into a hardness that will permit the bit to withstand the extreme stress that it will be subjected to during use.

Depending upon the shape of the diamond tip, the invention can be used for a variety of purposes. The multiple hammering of gold, silver or other precious metal with a sharp tip would impart a sparkling effect known as "laser diamond brilliance" to the metal. A tip of lesser pointedness could be used for engraving and designing. A flat tip could be used for hammering. Other precious stone can also be used. Diamond, of course, is the preferred stone since it is the hardest known substance. But other stones such as ruby or emerald may also be used so long as it is substantially harder than the metal that it is to be used on.

The drawings and the foregoing description are not intended to represent the only form of the invention in regard to the details of its construction and manner of operation. In fact, this apparatus and method can be adapted to a great many different situations. Changes in form and in the proportion of parts, as well as the substitution of equivalents, are contemplated as circumstances may suggest or render expedient; and although specific terms have been employed, they are intended in a generic and descriptive sense only and not for the purpose of limitation, the scope of the invention being delineated in the following claims.

The invention is claimed as follows:

1. A diamond-tipped bit for use with a jeweler's hammer, the bit comprising:
    a shaft portion having a threaded portion formed on one end and a bore formed on the other end, said bore having a rear surface and an annular rim portion surrounding said bore; and
    a diamond shaped to have a flat rear portion and to be slightly smaller in width than the diameter of said bore, said diamond having a length longer than depth of said bore, said annular rim portion clasping said diamond around an entire circumference into a firm stationary position within said bore.

2. A bit as claimed in claim 1 wherein said diamond has a pointed tip opposite said flat rear portion.

3. A method of producing a diamond-tipped bit for use with a jeweler's hammer, said method comprising the steps of:
    forming a shaft having a bore on one end, said bore having rear surface and an annular rim portion;
    shaping a diamond so that said diamond has a flat rear portion;
    depositing said diamond within said bore so that said flat rear portion lies flush against said rear surface;
    applying pressure to said rim portion so that said rim portion is circumferentially folded back onto the diamond, wherein said diamond is held firmly and immovably in place within said bore.

4. A method as claimed in claim 3 wherein said forming step includes forming a threaded portion onto said shaft portion on an end of said shaft opposite to said bore.

5. A method as claimed in claim 3 wherein said shaping step further comprises sharpening a point opposite to said flat rear portion of said diamond.

6. A diamond-tipped bit for use with a jeweler's hammer, the bit comprising:
    a shaft portion comprising a single unitary piece, said shaft portion having a threaded portion formed on one end and a bore formed on the other end, said bore having a rear surface and an annular rim portion surrounding said bore, and
    a diamond shaped to have a flat rear portion and to be slightly smaller in width than the diameter of said bore, said diamond having a length longer than depth of said bore, said annular rim portion clasping said diamond around an entire circumference into a firm stationary position within said bore.

* * * * *